US012703433B2

(12) United States Patent
Bowen et al.

(10) Patent No.: US 12,703,433 B2
(45) Date of Patent: Aug. 11, 2026

(54) TIRE BLOWOUT PROTECTION SYSTEM FOR AN INDEPENDENT SUSPENSION SYSTEM

(71) Applicant: RV-DE-Fender, LLC, Herriman, UT (US)

(72) Inventors: Gregory Adam Bowen, Herriman, UT (US); Todd Ryan Smith, Sandy, UT (US); Zackary Donald Patterson, Harrisville, UT (US)

(73) Assignee: RV-DE-Fender, LLC, Herriman, UT (US)

( * ) Notice: Subject to any disclaimer, the term of this patent is extended or adjusted under 35 U.S.C. 154(b) by 0 days.

(21) Appl. No.: 19/190,447

(22) Filed: Apr. 25, 2025

(65) Prior Publication Data

US 2025/0333117 A1 Oct. 30, 2025

Related U.S. Application Data

(60) Provisional application No. 63/677,286, filed on Jul. 30, 2024, provisional application No. 63/640,802, filed on Apr. 30, 2024.

(51) Int. Cl.
*B62D 25/16* (2006.01)
*B60R 19/00* (2006.01)

(52) U.S. Cl.
CPC ............ *B62D 25/163* (2013.01); *B60R 19/00* (2013.01); *B60R 2019/002* (2013.01)

(58) Field of Classification Search
CPC ...... B62D 25/163; B62D 25/16; B60R 19/00; B60R 2019/002
See application file for complete search history.

(56) References Cited

U.S. PATENT DOCUMENTS

| | | | |
|---|---|---|---|
| 332,022 | A | 12/1885 | Todd |
| 460,053 | A | 9/1891 | Paine |
| 857,747 | A | 6/1907 | McCauley |
| 1,454,738 | A | 5/1923 | Thomas |

(Continued)

FOREIGN PATENT DOCUMENTS

| | | | |
|---|---|---|---|
| AT | 396349 | B | 6/1993 |
| CN | 108609057 | A | 10/2018 |

(Continued)

OTHER PUBLICATIONS

Deere, John Deere 3010 Row-Crop and Standard Tractors Operator's Manual, OM-R32385, "Operation" section, (Site visited Sep. 3, 2024), Deere.com, URL: https://techinfo-omview.apps-prod-vpn.us.e06.c01.johndeerecloud.com/omview/omr32385/8 (Year 1965).

(Continued)

*Primary Examiner* — Jason D Shanske
*Assistant Examiner* — Matthew James O'Neill
(74) *Attorney, Agent, or Firm* — Gurr & Brande, PLLC; Robert A. Gurr

(57) ABSTRACT

A protective covering assembly for a tire features a wing bracket, a mounting bracket coupled to the wing bracket, and a fender coupled to the wing bracket. The mounting bracket is configured to couple to a swing arm of an independent suspension system of a trailer. As a result, the fender is suspended around at least a portion of a tire to thereby protect the trailer from a tire blowout.

20 Claims, 10 Drawing Sheets

(56) References Cited

U.S. PATENT DOCUMENTS

| | | | | |
|---|---|---|---|---|
| 1,488,136 | A | 3/1924 | Simpson | |
| 2,771,304 | A | 11/1956 | La Pere | |
| 2,947,375 | A | 8/1960 | Lehmann | |
| 3,560,021 | A | 2/1971 | Watson | |
| 4,934,733 | A | 6/1990 | Smith | |
| 5,169,167 | A | 12/1992 | Willson | |
| 5,269,396 | A | 12/1993 | Jones | |
| 5,387,001 | A | 2/1995 | Hull | |
| 5,533,781 | A | 7/1996 | Williams | |
| 5,836,399 | A | 11/1998 | Maiwald | |
| 5,951,123 | A | 9/1999 | Bomstad | |
| 6,336,677 | B2 | 1/2002 | Scott | |
| 6,658,984 | B2 | 12/2003 | Zonak | |
| 6,802,517 | B1 | 10/2004 | Wulhrich | |
| 7,523,980 | B2 | 4/2009 | Okamoto | |
| 7,832,812 | B1 | 11/2010 | Scott | |
| 8,052,200 | B2 | 11/2011 | Bharani et al. | |
| 8,657,350 | B2 | 2/2014 | Cabo | |
| 8,770,655 | B1 | 7/2014 | Godby | |
| 8,827,015 | B2 | 9/2014 | Power | |
| 9,193,392 | B2 | 11/2015 | Lodi | |
| 9,637,176 | B2 | 5/2017 | Heino | |
| 9,969,211 | B2 | 5/2018 | Niemczyk | |
| 10,054,177 | B2 | 8/2018 | Emmons | |
| 10,260,580 | B2 | 4/2019 | Merrill | |
| 10,323,909 | B2 | 6/2019 | Carton et al. | |
| 10,690,205 | B2 | 6/2020 | Emmons | |
| 10,882,566 | B2 | 1/2021 | Bering | |
| 11,318,998 | B2 | 5/2022 | Hamel | |
| 11,453,444 | B2 | 9/2022 | Bowen | |
| 11,802,598 | B2 | 10/2023 | Philpott | |
| 12,122,455 | B2 | 10/2024 | Bowen | |
| 2004/0118643 | A1 | 6/2004 | Booher | |
| 2005/0168056 | A1 | 8/2005 | Roberts | |
| 2006/0108765 | A1 | 5/2006 | Teich | |
| 2007/0001484 | A1 | 1/2007 | Okamoto | |
| 2007/0182151 | A1 | 8/2007 | Aulabaugh | |
| 2008/0006742 | A1 | 1/2008 | Guering | |
| 2011/0080019 | A1 | 4/2011 | Castillo | |
| 2012/0080908 | A1 | 4/2012 | Wellman | |
| 2013/0098697 | A1 | 4/2013 | Power | |
| 2013/0313389 | A1 | 11/2013 | Lodi | |
| 2015/0299982 | A1 | 10/2015 | Angelo | |
| 2016/0059902 | A1 * | 3/2016 | Xu | B62D 65/02 29/898.07 |
| 2016/0128278 | A1 | 5/2016 | Rau | |
| 2016/0288843 | A1 | 10/2016 | Fujimoto | |
| 2017/0191535 | A1 | 7/2017 | Emmons | |
| 2017/0313129 | A1 | 11/2017 | Garrett | |
| 2017/0334486 | A1 | 11/2017 | Plebani | |
| 2018/0245646 | A1 | 8/2018 | Merrill | |
| 2018/0355934 | A1 | 12/2018 | Emmons | |
| 2020/0122782 | A1 | 4/2020 | Hamel | |
| 2020/0262488 | A1 | 8/2020 | Bering | |
| 2020/0262498 | A1 | 8/2020 | Bender | |
| 2022/0018404 | A1 | 1/2022 | Philpott | |
| 2022/0177043 | A1 * | 6/2022 | Bowen | B62D 25/163 |

FOREIGN PATENT DOCUMENTS

| | | | | |
|---|---|---|---|---|
| CN | 110091688 | A | 8/2019 | |
| CN | 110406373 | A | 11/2019 | |
| DE | 102004054692 | A1 | 6/2006 | |
| EP | 0913320 | A2 | 5/1999 | |
| EP | 1314633 | A1 | 5/2003 | |
| FR | 574516 | A | 7/1924 | |
| FR | 2847876 | A1 | 6/2004 | |
| FR | 2896224 | A1 | 7/2007 | |
| GB | 2043006 | A | 10/1980 | |
| KR | 19980036635 | U | 9/1998 | |
| WO | 2014047093 | A1 | 3/2014 | |
| WO | 2016075573 | A1 | 10/2015 | |
| WO | 2017125904 | A1 | 7/2017 | |
| WO | 2017146277 | A1 | 8/2017 | |
| WO | 2017204715 | A1 | 11/2017 | |
| WO | 2018229048 | A1 | 6/2018 | |
| WO | WO-2023187809 | A1 * | 10/2023 | B62D 25/16 |

OTHER PUBLICATIONS

TractorData.com entry for John Deere 3010 Tractor; (Site visited Sep. 3, 2024); TractorData. com; URL: https://tractordata.com/farm-tractors/000/0/6/60-john-deere-3010.html (Year 2000-2023).

Big Iron 2018 Auction Listing for 1961 John Deere 3010 Narrow Front 2WD Tractor; (Site visited Sep. 3, 2024); BigIron.com; URL: https://www.bigiron.com/Lots/1961JohnDeere3010narrowfront2WDTractor (Year 2018).

Yesterday's Tractor Co listing for John Deere 3010 Fender Bracket, used; yesterdaytractors.com (Site visited Sep. 3, 2024); URL: https://www.yesterdaystractors.com/499434_Fender-Bracket-Used_77969.htm (Year 1997-2024).

John Deere Operators Manual OMLG100524 entry for Adjusting the Fixed Fenders; manuals.deere.com (Site visited Sep. 3, 2024); URL: http://manuals.deere.com/omview/OMLG100524_19/?tM=#:~:text=All%20information,%20illustrations%20and%20specifications%20in%20this%20manual%20are%20based (Year 201.

Jul. 18, 2016 capture of Minimizer Lift Axle Bracket (Site visited Sep. 3, 2024); web.archive.org; URL: https://web.archive.org/web/20160616013604/www.minimizer.com/product/minimizer-lift-axle-bracket/ (Year 2016).

* cited by examiner

TIRE BLOWOUT PROTECTION SYSTEM FOR AN INDEPENDENT SUSPENSION SYSTEM

CROSS-REFERENCE TO RELATED APPLICATIONS

This application claims the benefit of U.S. Provisional Application Ser. No. 63/640,802, filed on Apr. 30, 2024 and further claims the benefit of U.S. Provisional Application Ser. No. 63/677,286, filed on Jul. 30, 2024, both of which are incorporated herein by reference.

TECHNICAL FIELD

The present disclosure relates to protective coverings, such as fenders, around the wheel of a vehicle or trailer. More particularly, the present disclosure relates to a protective covering that is couplable to an independent suspension system of a trailer.

BACKGROUND

Recreational vehicles (RVs), including travel trailers, have become increasingly popular for leisure and travel purposes due to their convenience and the freedom they offer users. However, these vehicles are not without their challenges and risks. One significant issue faced by RV owners is the occurrence of tire blowouts. Tire blowouts can happen unexpectedly and are often caused by factors such as overloading, under-inflation, road hazards, and wear and tear. When a tire blowout occurs, it can lead to a sudden loss of control, posing a serious safety risk to the occupants and other road users.

The aftermath of a tire blowout can be particularly damaging to travel trailers. The structural integrity of the trailer can be compromised, leading to damage that may require costly repairs. The sidewalls, undercarriage, and other critical components of the trailer are vulnerable to the impact and debris resulting from a blown tire. Consequently, there is a pressing need for solutions that can mitigate the damage caused by tire blowouts, thereby enhancing the safety and longevity of travel trailers.

Various protective coverings and devices have been developed to address this issue. However, existing solutions often fall short in providing comprehensive protection or are incompatible with certain trailer designs and suspension systems. Specifically, many travel trailers are equipped with independent suspension systems that offer improved handling and ride quality. These systems present unique challenges for the integration of protective coverings, as they require flexible and adaptable solutions that can accommodate the dynamic movements and varying configurations of the suspension components.

Therefore, there remains a need for an innovative protective covering that can effectively prevent or reduce damage to travel trailers in the event of a tire blowout. Such a covering must be capable of coupling seamlessly with independent suspension systems, ensuring both compatibility and optimal performance. Addressing this need would significantly enhance the safety and durability of travel trailers, providing peace of mind to RV owners and contributing to a safer travel experience.

The present disclosure seeks to solve these and other problems.

SUMMARY OF EXAMPLE EMBODIMENTS

In some embodiments, a protective covering assembly for a tire comprises a wing bracket, mounting bracket coupled to the wing bracket, and a fender coupled to the wing bracket, the mounting bracket configured to couple to a swing arm of an independent suspension system of a trailer.

In some methods of installing a protective covering assembly on an independent suspension system comprises the method comprising accessing a swing arm of the independent suspension; coupling the protective covering assembly to the swing arm by positioning a mounting bracket to abut a top and a first end of the swing arm, with a spindle of the independent suspension system passing through an aperture in the mounting bracket and an aperture in a wing bracket that is coupled to the mounting bracket; coupling a hub to the spindle; coupling a fender to the wing bracket; and coupling a tire to the hub.

DETAILED DESCRIPTION OF EXAMPLE EMBODIMENTS

Figure 1:
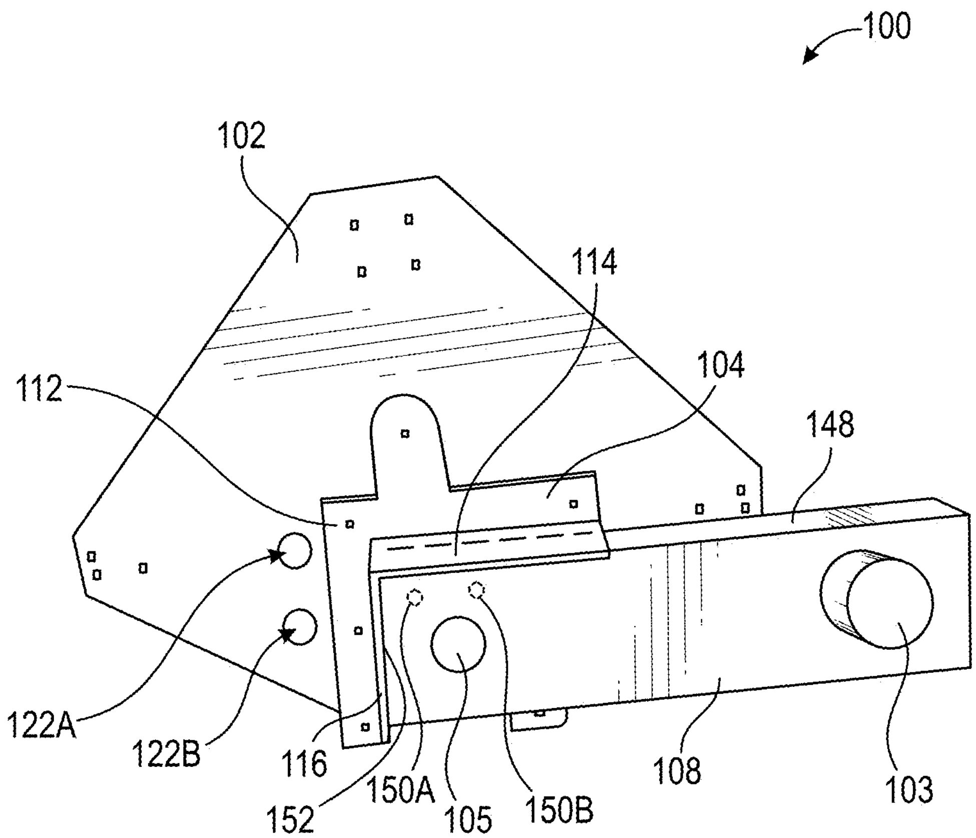
FIG. 1 illustrates a rear perspective view of a protective covering assembly coupled to a swing arm of an independent suspension system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a protective covering that is capable of coupling to independent suspension systems. The protective covering assembly for a tire disclosed herein solves these and other problems.

Referring to FIGS. 1-4, in some embodiments, a protective covering assembly 100 for a tire comprises a wing bracket 102, a mounting bracket 104 coupled (e.g., bolts, welds, etc.) to the wing bracket 102, and a fender 106 (FIGS. 6-8) coupled to the wing bracket 102. The mounting bracket 104 is configured to couple to a swing arm 108 of an independent suspension system 110 (FIGS. 6-7) of a trailer (e.g., RV trailer), which may be accomplished using bolts, screws, welds, or other coupling means, as will be discussed in more detail later herein.

As shown, the mounting bracket 104 may comprise a first vertical portion 112 for abutting and coupling to the wing bracket 102, a horizontal portion 114 for abutting a top of the trailer swing arm 108, and a second vertical portion 116 abutting an end of the trailer swing arm 108. The horizontal portion 114 and the second vertical portion 116 are both perpendicular, or substantially perpendicular, to the wing bracket 102 and first vertical portion 112 for coupling to the swing arm 108. As appreciated and as shown in FIG. 1, the swing arm 108 is coupled to the trailer axle 103 and the trailer spindle 105.

Figure 2:
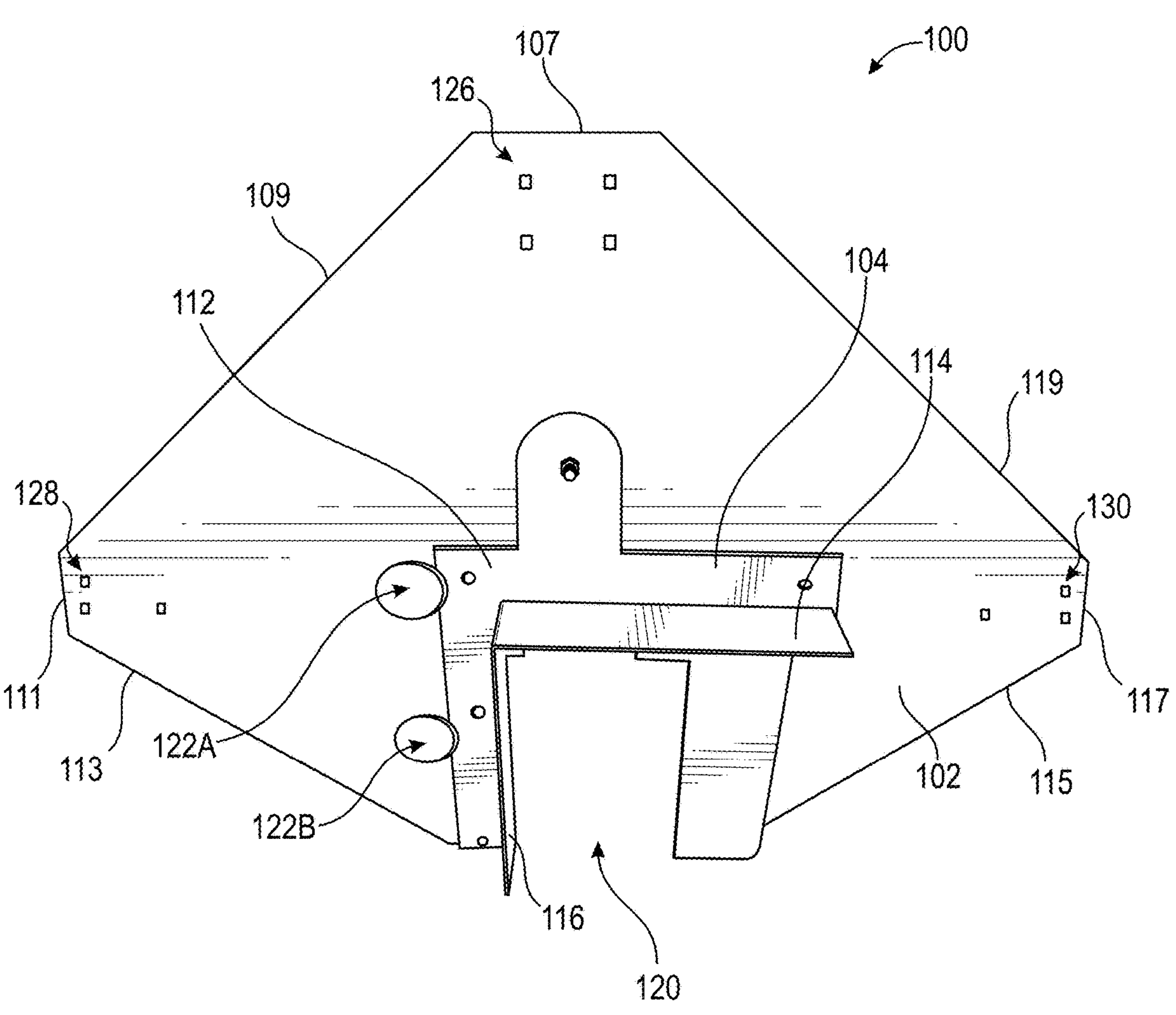
FIG. 2 illustrates a rear perspective view of a protective covering assembly.
Figure 3:
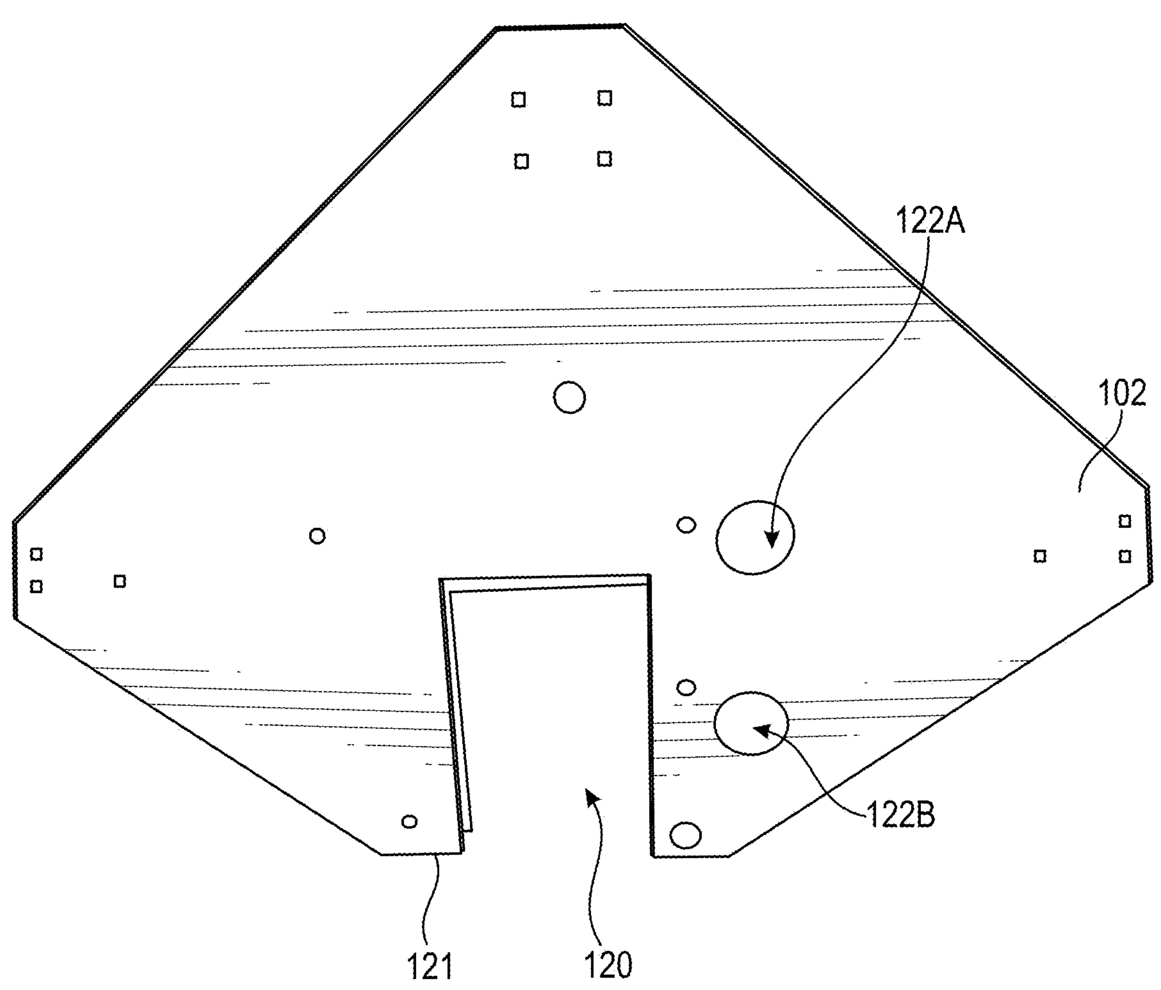
FIG. 3 illustrates a front view of a protective covering assembly.
Figure 4:
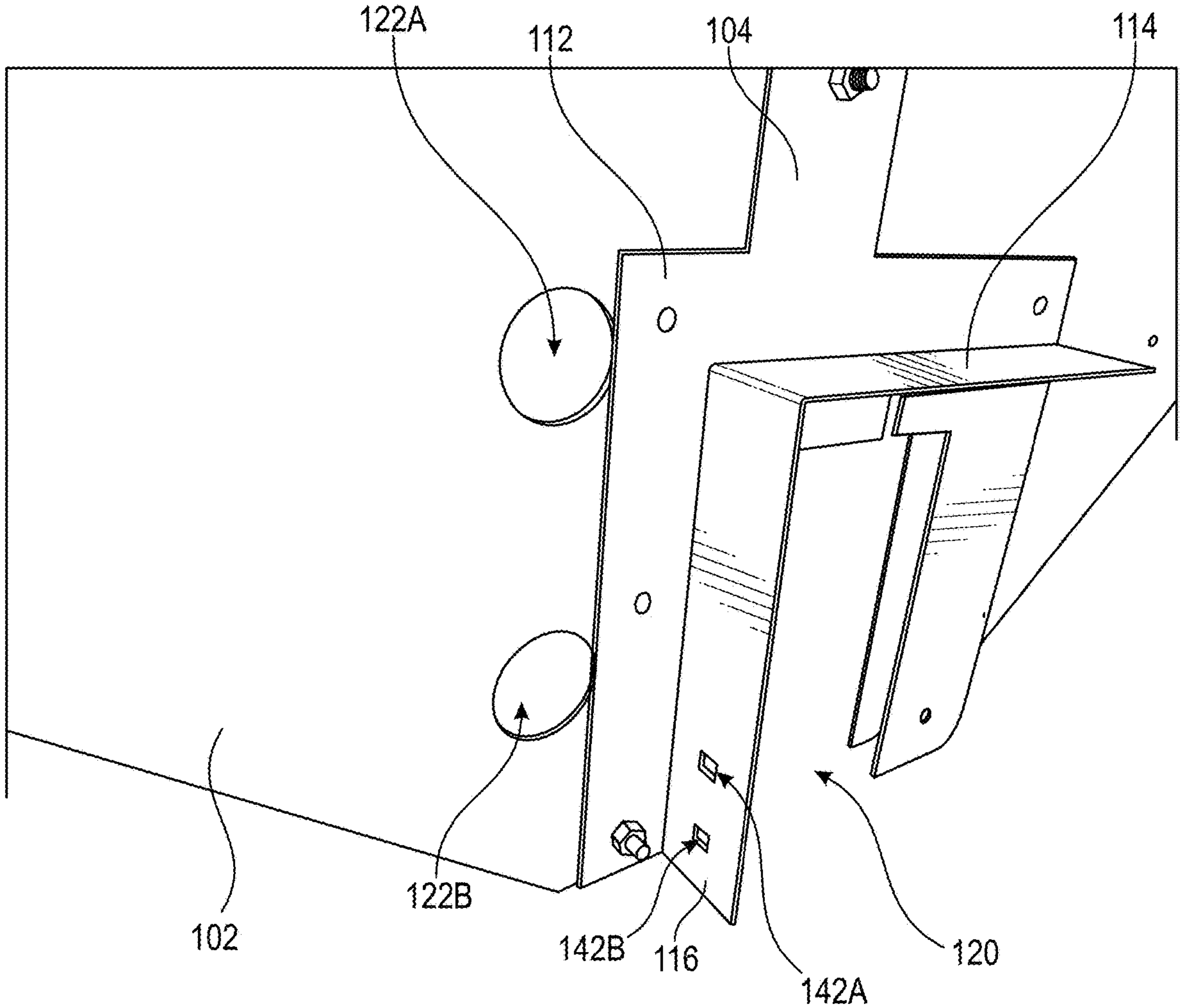
FIG. 4 illustrates a detailed rear, side perspective view of a protective covering assembly.

FIGS. 2-4 illustrate the wing bracket 102 which, in some embodiments, may be generally diamond-shaped. For example, the wing bracket 102 may comprise a top edge 107, a first left angled edge 109, a left side edge 111, a second left angled edge 113, a first right angled edge 115, a right side edge 117, and a second right angled edge 119. The wing bracket 102 further comprises an aperture 120 at its base 121, the aperture 120 configured to allow the spindle 105 to pass therethrough for coupling to a hub 123 (e.g., brake hub or idler hub; best seen in FIG. 8).

Figure 8:
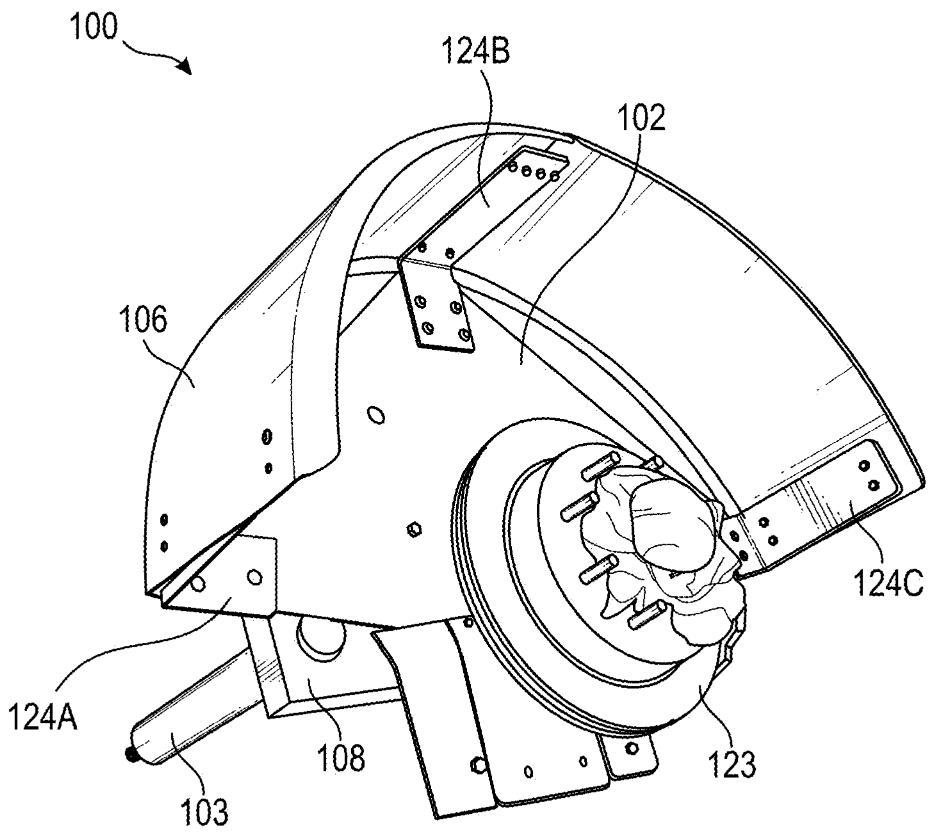
FIG. 8 illustrates a front, side perspective view of a protective covering assembly coupled to an independent suspension system.

The wing bracket 102 may further comprise a plurality of coupling sites for the fender support arms 124 (FIG. 8). For example, a first set of apertures 126 may be proximal to the top edge 107, a second set of apertures 128 may be proximal to the left side edge 111, and a third set of apertures 130 may be proximal to the right side edge 117. As shown, the mounting bracket 104 is configured to surround a portion of the aperture 120 (e.g., three sides, leaving the bottom open), the mounting bracket configured to couple to the swing arm 108. The wing bracket 102 may further comprise brake access apertures 122A-B. In other words, the brake access apertures 122A-B may allow a user to access disc brake caliper bolts or other portions of the brakes without the need to remove the protective covering assembly 100 from the wheel assembly.

Figure 5:
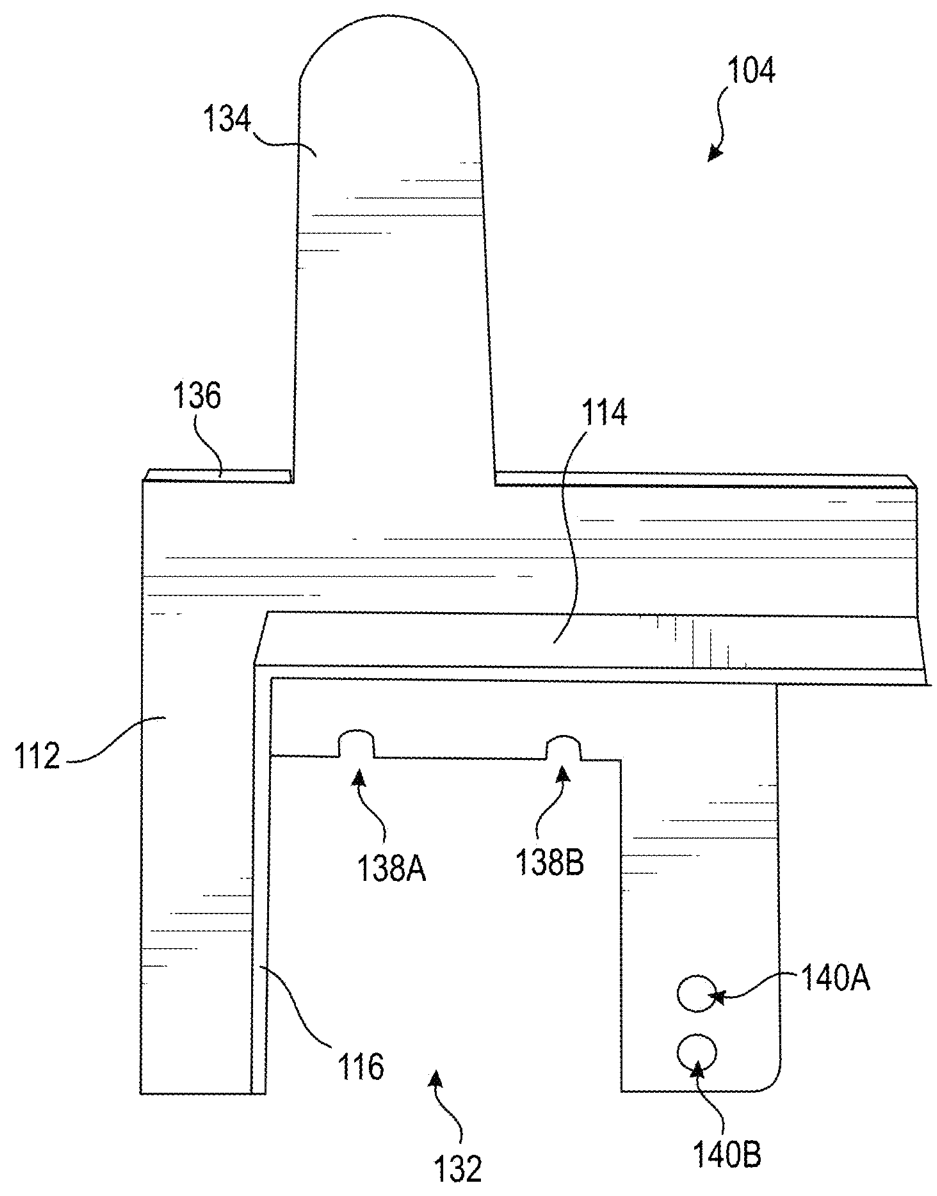
FIG. 5 illustrates a rear view of a mounting bracket of a protective covering assembly.

FIG. 5 illustrates, in some embodiments, a mounting bracket 104. As previously discussed, the mounting bracket 104 may comprise a first vertical portion 112 for abutting and coupling to the wing bracket 102, a horizontal portion 114 for abutting a top of the trailer swing arm 108, and a second vertical portion 116 abutting an end of the trailer swing arm 108. The horizontal portion 114 and the second vertical portion 116 are both perpendicular, or substantially perpendicular, to the wing bracket 102 and first vertical portion 112 for coupling to the swing arm 108. The second vertical portion 116 is also perpendicular, or substantially perpendicular, to the horizontal portion 114. The mounting bracket further comprises a spindle aperture 132 complementary to the aperture 120 of the wing bracket 102. The shape and configuration of the mounting bracket 104 may vary. For example, in some embodiments, a brace arm 134 may extend upwardly from a top edge 136. It will be appreciated that the brace arm 134 may be a variety of shapes and sizes without departing herefrom, such as T-shaped (e.g., FIG. 7), rectangular, semi-circular, or any other geometric shape.

The top edge of the spindle aperture 132 may comprise one or more bolt receiving recesses 138A-B to receive bolts attached to the swing arm 108. The first vertical portion 112 may further comprise one or more fastener apertures 140A-B for receiving bolts or other fasteners therethrough to couple to the swing arm 108. Likewise, the second vertical portion 116 may further comprise one or more fastener apertures 142A-B for receiving bolts or other fasteners therethrough to couple to the swing arm 108.

Figure 6:
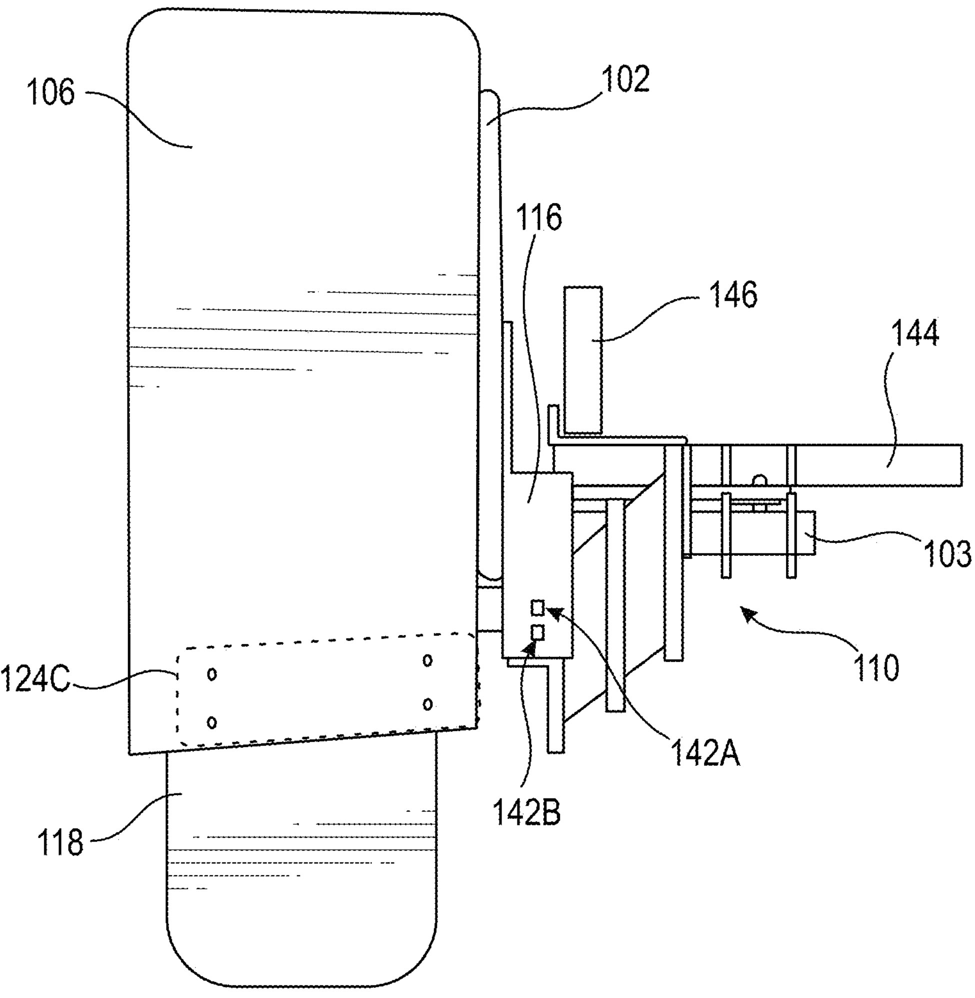
FIG. 6 illustrates a side elevation view of a protective covering assembly coupled to an independent suspension system.
Figure 7:
FIG. 7 illustrates a rear, side perspective view of a protective covering assembly coupled to an independent suspension system.
Figure 7:
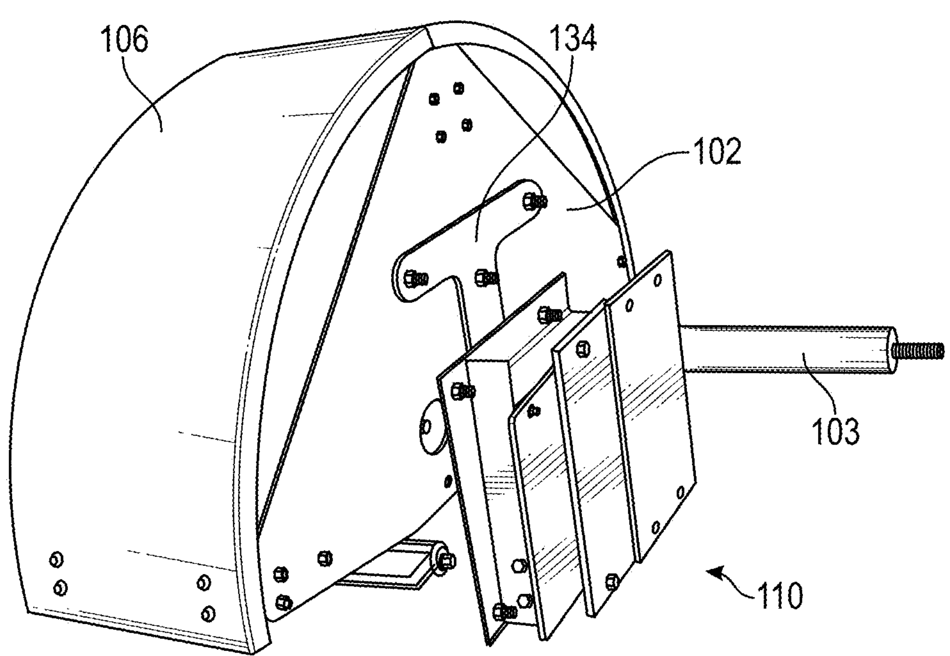

FIGS. 6-8 illustrate the protective covering assembly 100 coupled to an independent suspension system 110 of a trailer. As shown, the fender 106 extends from the wing bracket 102 to thereby surround a top portion of the tire 118. In some embodiments, one or more fender support arms 124A-C (best shown in FIG. 8) may extend from the wing bracket 102, with the fender 106 coupling to the one or more fender support arms 124A-C. For example, a first support arm 124A may couple to the second set of apertures 128 on the left side edge 111, a second support arm 124B may couple to the first set of apertures 126 on the top edge 107, and a third support arm 124C may couple to the third set of apertures 130 on the right side edge 117, each support arm 124A-C extending along a width of fender 106 to thereby support the fender 106 suspended thereon. The fender support arms 124A-C may be coupled to the wing bracket 102 and the fender 106 via screws, bolts, welds, or other coupling mechanisms. FIG. 6 illustrates the trailer floor 144, the trailer frame 146, the trailer axle 103, and the independent suspension system 110.

As best seen in FIG. 1, in one method of installing the protective covering assembly 100, with the tire 118 and hub 123 not coupled to the swing arm 108 so that the swing arm 108 is exposed, a user loosens one or more bolts 150A-B on the swing arm 108 (these bolts 150A-B are on the side facing the wing bracket 102), and then positions the protective covering assembly 100 such that the one or more bolt receiving recesses 138A-B of the mounting bracket 104 are interposed between the head of the bolts 150A-B and the swing arm 108. In this position, the horizontal portion 114 of the mounting bracket abuts a top 148 of the swing arm 108 and a first end 152 of the swing arm 108 abuts the second vertical portion 116 of the mounting bracket 108.

With the mounting bracket 104 abutting the swing arm 108, a user may securely couple them together via one or more screws, bolts, or other fasteners. For example, fasteners may pass through apertures 140A-B of the first vertical portion 112 and into the swing arm 108, and may likewise pass through fastener apertures 142A-B of the second vertical portion 116 and into the swing arm 108. Once the mounting bracket 104 and wing bracket 102 are securely fastened, the user may couple the fender 106 to the wing bracket 102 via the fender support arms 124A-C. This may be accomplished by coupling each fender support arm 124A-C to the respective apertures 126, 128, 130 on the wing bracket 102, and then fastening the fender 106 to the fender support arms 124A-C, all of which may be accomplished with bolts, screws, etc.

With the protective covering assembly 100 fastened to the swing arm 108, the user may then couple the hub 123 to the spindle 105, and subsequently couple the tire 118 to the hub 123. As a result, the fender 106 covers at least a top portion of the tire 118, thereby protecting the trailer in the event of a tire blowout. Additionally, because the protective covering assembly 100 is coupled to the swing arm 108, it moves when the swing arm 108 moves, thereby protecting trailers with independent suspension systems, which is not addressed by the prior art.

Figure 9:
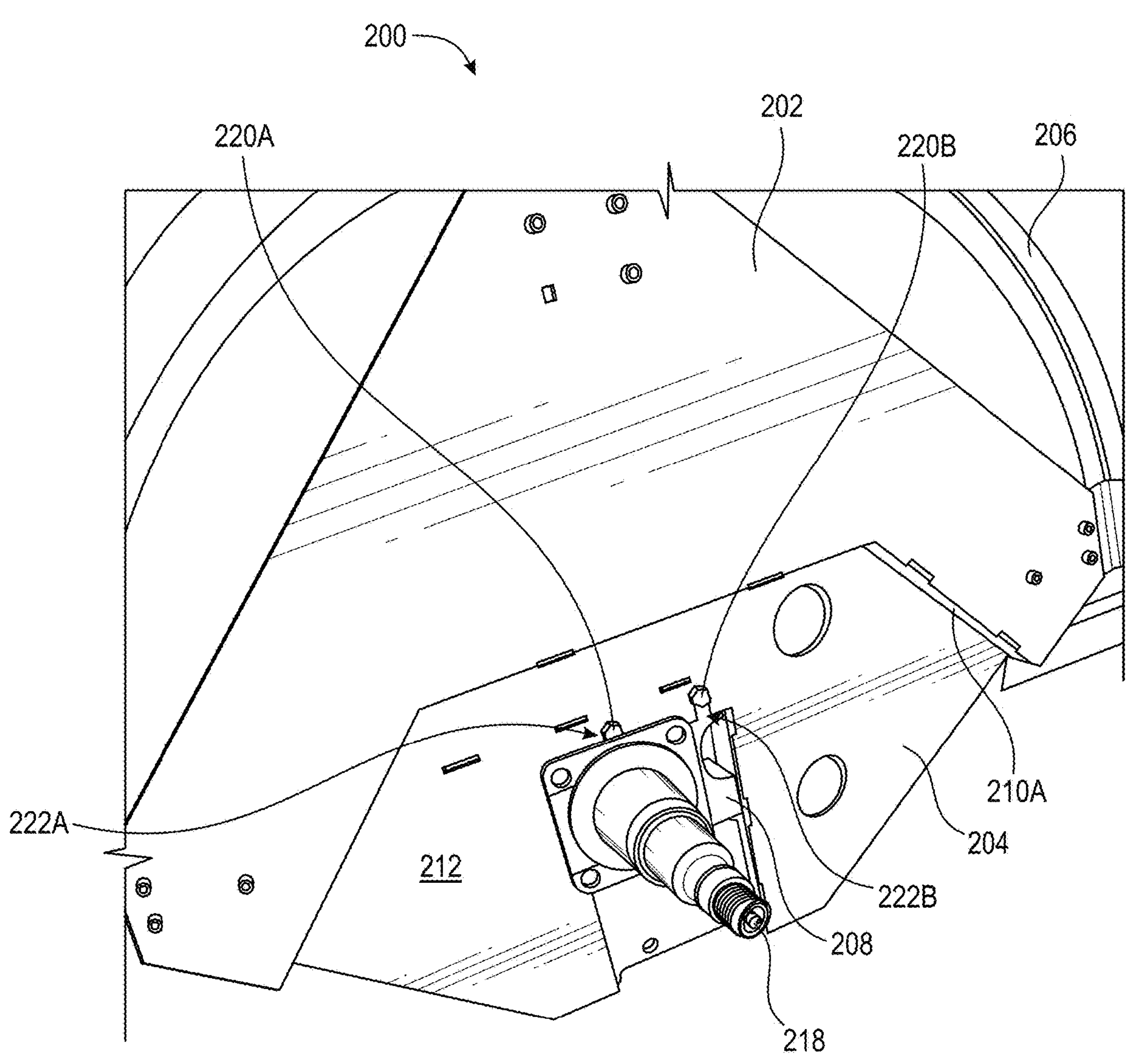
FIG. 9 illustrates a front perspective view of a protective covering assembly coupled to a swing arm and spindle of an independent suspension system.
Figure 10:
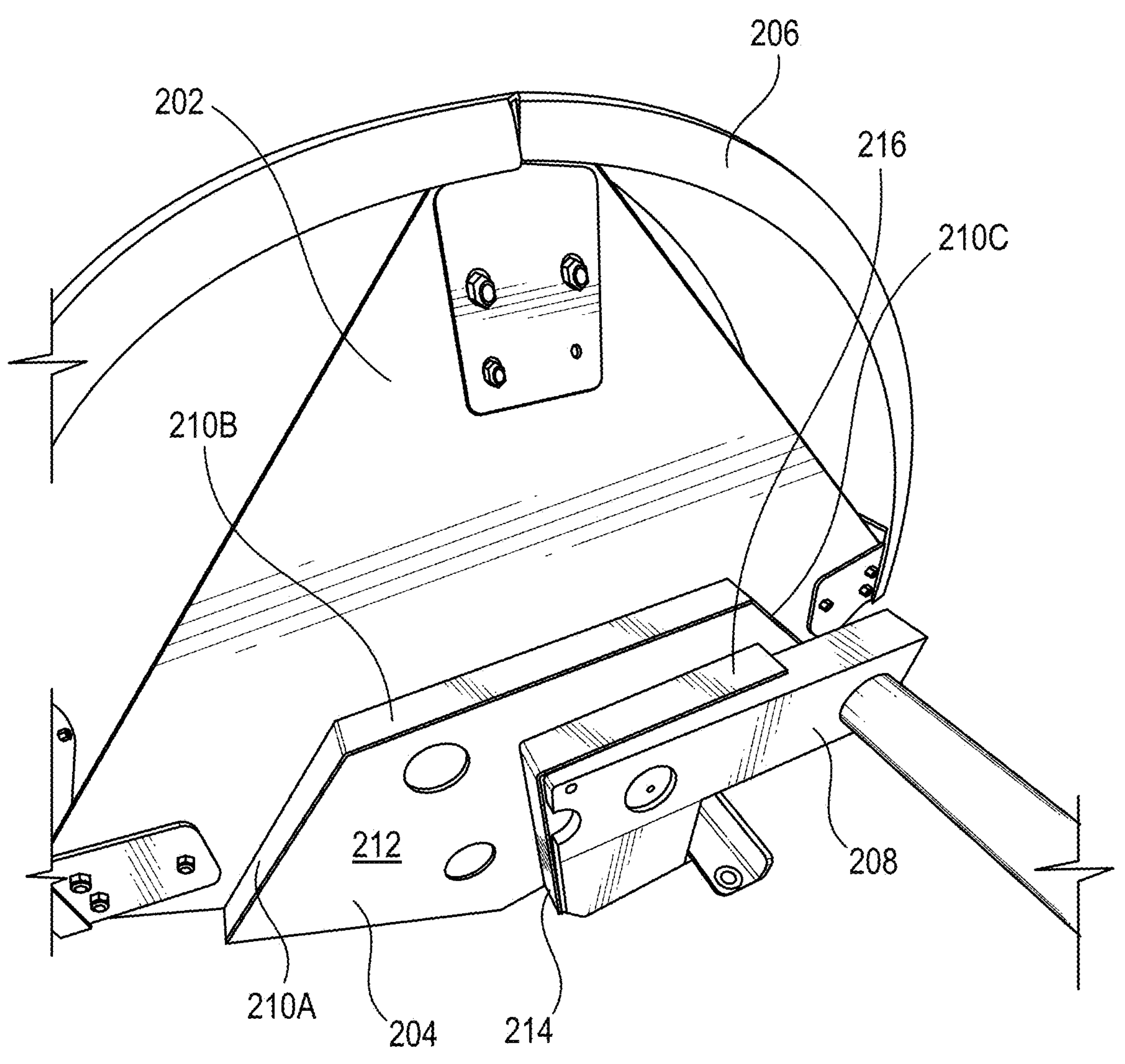
FIG. 10 illustrates a rear perspective view of a protective covering assembly coupled to a swing arm of an independent suspension system.

As noted earlier, the mounting bracket 104 may be in alternate configurations without departing herefrom. Accordingly, in some embodiments, as shown in FIGS. 9-10, a protective covering assembly 200 for a tire comprises a wing bracket 202, a mounting bracket 204 coupled to the wing bracket 102 (such as via welds for a permanent coupling, or bolts for a removably attachable coupling), and a fender 206 coupled to the wing bracket 202.

The mounting bracket 204 is configured to couple to a swing arm 208 of an independent suspension system of a trailer (e.g., RV trailer), which may be accomplished using bolts, screws, welds, or other coupling means. As best seen in FIG. 10, the mounting bracket 204 may extend outwardly from the surface of the wing bracket 202. For example, the mounting bracket 204 may comprise one or more edges 210A-C that are perpendicular, or substantially perpendicular, to the wing bracket 202 and surface 212 of the mounting bracket 204, the edges 210A-C being interposed between the wing bracket 202 and the surface 212. As in prior embodiments, the mounting bracket 204 may further comprise a vertical portion 214 for abutting an end of the swing arm 208 and a horizontal portion 216 for abutting a top of the swing arm 208. The vertical portion 214 and horizontal portion 216 effectively framing an aperture through which spindle 218 (FIG. 9) passes. Bolts 220A-B of the swing arm 208 may be received through receiving apertures 222A-B of the mounting bracket 204 so as to form a tight fit between the mounting bracket 204 and the swing arm 208.

Accordingly, it will be appreciated from the foregoing that the protective covering assembly 100, 200 disclosed herein solves the need for a protective covering that is capable of coupling to independent suspension systems to thereby protect trailers in the event of a tire blowout.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A protective covering assembly for use with tires having an independent suspension, the protective covering assembly comprising:
- a wing bracket;
- a mounting bracket coupled to the wing bracket, the mounting bracket configured to abut a swing arm of the independent suspension, the mounting bracket comprising an aperture configured to receive a spindle of the swing arm therethrough; and
- a fender coupled to the wing bracket, the fender configured to cover a portion of a tire.

2. The protective covering assembly of claim 1, wherein the fender is coupled to the wing bracket via a plurality of fender support arms.

3. The protective covering assembly of claim 1, wherein the wing bracket further comprises one or more brake access apertures.

4. The protective covering assembly of claim 1, wherein the mounting bracket comprises a first vertical portion, a horizontal portion perpendicular to the first vertical portion, and a second vertical portion perpendicular to both the first vertical portion and the horizontal portion.

5. The protective covering assembly of claim 4, wherein the first vertical portion comprises at least one fastener aperture.

6. The protective covering assembly of claim 4, wherein the second vertical portion comprises at least one fastener aperture.

7. The protective covering assembly of claim 4, wherein the first vertical portion further comprises a brace arm extending from a top edge.

8. The protective covering assembly of claim 1, wherein the mounting bracket comprises a vertical portion for abutting a first side of the swing arm and a horizontal portion for abutting a top of the swing arm.

9. The protective covering assembly of claim 8, wherein the mounting bracket comprises a plurality of edges interposed between the wing bracket and a surface of the mounting bracket.

10. A protective covering assembly for use with tires having an independent suspension, the protective covering assembly comprising:

a wing bracket, comprising:

a top edge, a first left angled edge, a left side edge, a second left angled edge, a first right angled edge, a right side edge, and a second right angled edge, and an aperture at a base, the aperture configured to receive a spindle therethrough;

a mounting bracket coupled to the wing bracket, the mounting bracket comprising:

a first vertical portion, a horizontal portion perpendicular to the first vertical portion, and a second vertical portion perpendicular to both the first vertical portion and the horizontal portion, wherein the horizontal portion and second vertical portion are configured to each abut a swing arm of the independent suspension; and a fender coupled to the wing bracket, the fender configured to cover a portion of a tire.

11. The protective covering assembly of claim 10, wherein the fender is coupled to the wing bracket via a plurality of fender support arms.

12. The protective covering assembly of claim 10, wherein the wing bracket further comprises one or more brake access apertures.

13. The protective covering assembly of claim 10, wherein the first vertical portion comprises at least one fastener aperture.

14. The protective covering assembly of claim 10, wherein the second vertical portion comprises at least one fastener aperture.

15. The protective covering assembly of claim 10, wherein the first vertical portion further comprises a brace arm extending from a top edge.

16. A method of installing a protective covering assembly for use with tires having an independent suspension, the method comprising:

accessing a swing arm of the independent suspension;

coupling the protective covering assembly to the swing arm by positioning a mounting bracket to abut a top and a first end of the swing arm, with a spindle of the independent suspension system passing through an aperture in the mounting bracket and an aperture in a wing bracket that is coupled to the mounting bracket;

coupling a hub to the spindle;

coupling a fender to the wing bracket; and coupling a tire to the hub.

17. The method of claim 16, wherein the mounting bracket is bolted to the swing arm by inserting a respective bolt into a respective fastening aperture of a plurality of fastening apertures.

18. The method of claim 16, wherein the fender is coupled to the wing bracket via a plurality of fender support arms, wherein each fender support arm is coupled to a set of apertures located on the wing bracket.

19. The method of claim 16, wherein the mounting bracket is coupled to the wing bracket via welds.

20. The method of claim 16, wherein the mounting bracket is coupled to the wing bracket via bolts.

* * * * *